United States Patent
Comarin et al.

(10) Patent No.: US 10,047,267 B2
(45) Date of Patent: Aug. 14, 2018

(54) STRONTIUM CARBONATE BRIDGING MATERIALS AND METHODS FOR MAKING AND USING SAME

(71) Applicant: Weatherford Technology Holdings, LLC, Houston, TX (US)

(72) Inventors: Marcelo Comarin, Bogota (CO); Maria F. Paramo G, Houston, TX (US); Fred Donham, Houston, TX (US); David P. Kippie, Houston, TX (US); Shawn Lu, Houston, TX (US); Michael C. Barry, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 14/068,621

(22) Filed: Oct. 31, 2013

(65) Prior Publication Data

US 2014/0323360 A1    Oct. 30, 2014

Related U.S. Application Data

(60) Provisional application No. 61/721,017, filed on Oct. 31, 2012.

(51) Int. Cl.
*C09K 8/08* (2006.01)
*C09K 8/74* (2006.01)
*C09K 8/03* (2006.01)

(52) U.S. Cl.
CPC .......... *C09K 8/032* (2013.01); *C09K 2208/18* (2013.01)

(58) Field of Classification Search
CPC .......... C09K 8/032; C09K 8/16; C09K 8/265; Y10S 507/906

USPC ......................................................... 507/269
See application file for complete search history.

(56) References Cited

U.S. PATENT DOCUMENTS

| | | | | |
|---|---|---|---|---|
| 2,283,564 | A * | 5/1942 | Means ..................... | C09K 8/05 507/140 |
| 7,661,481 | B2 | 2/2010 | Todd et al. | |
| 2005/0277551 | A1* | 12/2005 | Massam ............... | C04B 20/1022 507/103 |
| 2006/0234871 | A1 | 10/2006 | Dalrymple et al. | |
| 2007/0056735 | A1 | 3/2007 | Bosma et al. | |
| 2009/0258799 | A1* | 10/2009 | Hodder .................. | C09K 8/032 507/140 |
| 2010/0201066 | A1 | 8/2010 | Ivan et al. | |
| 2010/0311619 | A1* | 12/2010 | Mettath et al. ............... | 507/120 |
| 2012/0208934 | A1 | 8/2012 | Korte et al. | |

OTHER PUBLICATIONS

PCT ISR and Written Opinion.
McElfresh, Paul et al., "Studies of water swel lable NBR for downhole sealing applications", Rubber World 2008, vol. 238, No. 2, pp. 41-44. See the whole document.

* cited by examiner

*Primary Examiner* — Aiqun Li
(74) *Attorney, Agent, or Firm* — Vorys, Sater, Seymour & Pease LLP

(57) ABSTRACT

Drilling fluids were developed including a base fluid, a weighting agent and/or a bridging agent, and a thickening agent, where the weighting agent and/or the bridging agent includes a particulate strontium carbonate having a desired distribution, for weighting agents, the distribution includes particles between 2μ and 5000μ and for bridging agents, the distribution is constructed from particles having specific sizes. Methods making and using the drilling fluids were also discovered.

14 Claims, 3 Drawing Sheets

STRONTIUM CARBONATE BRIDGING MATERIALS AND METHODS FOR MAKING AND USING SAME

RELATED APPLICATIONS

This application claims priority to and the benefit of U.S. Provisional Patent Application Ser. No. 61/721,017, filed Oct. 31, 2012 (31 Oct. 2012).

BACKGROUND OF THE INVENTION

1. Field of the Invention

Embodiments of this invention relate to drilling fluids including a base fluid, a weighting agent and/or a bridging agent, and a thickening agent, and methods making and using same.

More particularly, embodiments of this invention relate to drilling fluids including a base fluid, a weighting agents and/or a bridging agent, and a thickening agent, where the weighting agent or bridging agent comprises a particulate strontium carbonate and methods making and using same.

2. Description of the Related Art

A variety of drilling fluids and weighting agents are presently on the market. Generally, drilling fluids have an aqueous or hydrocarbon base. One principal requirement of a good drilling fluid is that it is able to suspend a sufficient amount of weighting additives so as to meet desired density requirements particularly with respect to preventing gasification and blow-outs, while remaining pumpable. With respect to aqueous base drilling fluids, a variety of water thickeners are also known. Examples are organic materials such as xanthan gums, aluminum containing compositions, such as hydrous aluminum oxide, polyacrylates, polyacrylamides and a variety of cellulose derivatives. Examples of known weighting materials include barite, hematite, calcium carbonate; zinc, potassium or sodium halides or phosphates and formates.

In rotary drilling of wells, a drilling fluid is usually circulated down the drill string and back up the annulus between the drill string and the wellbore face. The drilling fluid can contain many different chemicals, but will most often contain a viscosifier, such as bentonite. When a casing string or liner is to be cemented into the wellbore, any drilling fluid and remnants of the viscosifier present in the wellbore are preferably removed to aid the bonding of the cement between the casing string or liner and the wellbore. In removing this drilling fluid from the wellbore and to clean the annulus, a wash or spacer fluid can be introduced ahead of a cement slurry.

U.S. Pat. No. 4,584,327 disclosed high density fluids including water; a gelling agent selected from the group consisting of oxides of antimony, zinc oxide, barium oxide, barium sulfate, barium carbonate, iron oxide, hematite, other irons ores and mixtures thereof wherein said gelling agent has an average particle diameter size in the range of from about 0.5 to about 10.0 micrometers; hydraulic cement wherein said hydraulic cement has an average particle size in the range of from about 30 to about 200 micrometers wherein said hydraulic cement and said gelling agent have a physical makeup with regard to fine particle size, high density and intersurface attraction properties sufficient to create a slurry with the water that has a gel strength of at least 10 pounds per 100 square feet; and a weighting material selected from the group consisting of iron powder, hematite, other iron ores, steel shot, tungsten, tin, manganese, iron shot, and mixtures thereof wherein said weighting material has an average particle diameter size of from about 2 to about 20 times the average particle size of the gelling agent; said fluid having a density of from 24 pounds per gallon to about 40 pounds per gallon.

Even though there are many drilling fluids and many weighting agents, there is still a need in the art for drilling fluids with alternate weighting agents, which permit easier filter cake removal and improved tailoring and optimized drilling fluids.

SUMMARY OF THE INVENTION

Drilling fluids including a base fluid, a thickening system, a weighting system, where the weighting system includes an effective amount of strontium carbonate weighting agents or a mixture of a calcium carbonate weighting agent and strontium carbonate weighting agent. The strontium carbonate weighting agent includes particles less than or equal to about 5000μ.

Drilling fluids including a base fluid, a thickening system, a weighting system, and a bridging system, where the weighting system includes an effective amount of calcium carbonate weighting agent, a strontium carbonate weighting agent or a mixture of a calcium carbonate weighting agent and strontium carbonate weighting agent. The strontium carbonate weighting agent includes particles less than or equal to about 5000μ. The strontium carbonate bridging agent includes a single strontium carbonate mode or a mixture of single strontium carbonate modes, where the modes are particles having sized of D50 of 2μ, 10μ, 20μ, 50μ, 100μ, 200μ, 500μ, 1000μ, 2000μ, 3000μ, 4000μ and 5000μ. In certain embodiments, the strontium carbonate includes equal amounts of particle modes having D50 of 2μ, 10μ, 20μ, 50μ, 100μ, 200μ, 500μ, 1000μ, 2000μ, 3000μ, 4000μ and 5000μ. These types of equal particle size distributions are effective for use in formation zones, screens, gravel packs, or similar structures having pore sizes that range from 2μ to 5000μ. For formation zones, screens, gravel packs, or similar structures having a given pore size distribution, the strontium carbonate weighting and/or bridging agents may be tailored by adding different amount of each mode to substantially mimic the pore size distribution. In other embodiment, the strontium carbonate agent has a mono-modal distribution or a poly-modal distribution tailored to effectively plug a given pore size distribution of a formation, a screen, a gravel pack, or other similar structure.

Methods for making drilling fluids including a base fluid, a thickening system, a weighting system, where the weighting system includes an effective amount of strontium carbonate weighting agents or a mixture of a calcium carbonate weighting agent and strontium carbonate weighting agent, where the methods involve mixing the ingredients together at desired levels to produce a drilling fluid of this invention. The strontium carbonate weighting agent includes particles less than or equal to about 5000μ.

Methods for making drilling fluids including a base fluid, a thickening system, a weighting system, and a bridging system, where the weighting system includes an effective amount of calcium carbonate weighting agent, a strontium carbonate weighting agent or a mixture of a calcium carbonate weighting agent and strontium carbonate weighting agent, where the methods involve mixing the ingredients together in desired levels to produce a drilling fluid of this invention. The strontium carbonate weighting agent includes particles less than or equal to about d000μ. The strontium carbonate bridging agent includes a single strontium carbonate mode or a mixture of single strontium carbonate modes, where the modes are particles having sized of D50 of 2μ, 10μ, 20μ, 50μ, 100μ, 200μ, 500μ, 1000μ, 2000μ, 3000μ, 4000μ and 5000μ. The methods may also include measuring a pore size of the formation, screen, gravel pack, or other structure and formulating a strontium carbonate composition having a particle size distribution that is the same or substantially same as the pore size distribution. The strontium carbonate bridging agent includes a single strontium carbonate mode or a mixture of single strontium carbonate modes, where the modes are particles having sized of D50 of 2μ, 10μ, 20μ, 50μ, 100μ, 200μ, 500μ, 1000μ, 2000μ, 3000μ, 4000μ and 5000μ. In certain embodiments, the strontium carbonate includes equal amounts of particle modes having D50 of 2μ, 10μ, 20μ, 50μ, 100μ, 200μ, 500μ, 1000μ, 2000μ, 3000μ, 4000μ and 5000μ. These types of equal particle size distributions are effective for use in formation zones, screens, gravel packs, or similar structures having pore sizes that range from 2μ to 5000μ. For formation zones, screens, gravel packs, or similar structures having a given pore size distribution, the strontium carbonate weighting and/or bridging agents may be tailored by adding different amount of each mode to substantially mimic the pore size distribution. In other embodiment, the strontium carbonate agent has a mono-modal distribution or a poly-modal distribution tailored to effectively plug a given pore size distribution of a formation, a screen, a gravel pack, or other similar structure.

Methods for using drilling fluids including a base fluid, a thickening system, a weighting system, where the weighting system includes an effective amount of strontium carbonate weighting agents or a mixture of a calcium carbonate weighting agent and strontium carbonate weighting agent, where the methods involve circulating a drilling fluid of this invention while drilling an oil or gas well. The strontium carbonate weighting agent includes particles less than or equal to about 5000μ. The strontium carbonate bridging agent includes a single strontium carbonate mode or a mixture of single strontium carbonate modes, where the modes are particles having sized of D50 of 2μ, 10μ, 20μ, 50μ, 100μ, 200μ, 500μ, 1000μ, 2000μ, 3000μ, 4000μ and 5000μ. In certain embodiments, the strontium carbonate includes equal amounts of particle modes having D50 of 2μ, 10μ, 20μ, 50μ, 100μ, 200μ, 500μ, 1000μ, 2000μ, 3000μ, 4000μ and 5000μ. These types of equal particle size distributions are effective for use in formation zones, screens, gravel packs, or similar structures having pore sizes that range from 2μ to 5000μ. For formation zones, screens, gravel packs, or similar structures having a given pore size distribution, the strontium carbonate weighting and/or bridging agents may be tailored by adding different amount of each mode to substantially mimic the pore size distribution. In other embodiment, the strontium carbonate agent has a mono-modal distribution or a poly-modal distribution tailored to effectively plug a given pore size distribution of a formation, a screen, a gravel pack, or other similar structure.

Methods for making drilling fluids including a base fluid, a thickening system, a weighting system, and a bridging system, where the weighting system includes an effective amount of calcium carbonate weighting agent, a strontium carbonate weighting agent or a mixture of a calcium carbonate weighting agent and strontium carbonate weighting agent, where the methods involve circulating a drilling fluid of this invention while drilling an oil or gas well. The strontium carbonate weighting agent includes particles less than or equal to about 5000μ. The strontium carbonate bridging agent includes a single strontium carbonate mode or a mixture of single strontium carbonate modes, where the modes are particles having sized of D50 of 2μ, 10μ, 20μ, 50μ, 100μ, 200μ, 500μ, 1000μ, 2000μ, 3000μ, 4000μ and 5000μ. The strontium carbonate bridging agent includes a single strontium carbonate mode or a mixture of single strontium carbonate modes, where the modes are particles having sized of D50 of 2μ, 10μ, 20μ, 50μ, 100μ, 200μ, 500μ, 1000μ, 2000μ, 3000μ, 4000μ and 5000μ. In certain embodiments, the strontium carbonate includes equal amounts of particle modes having D50 of 2μ, 10μ, 20μ, 50μ, 100μ, 200μ, 500μ, 1000μ, 2000μ, 3000μ, 4000μ and 5000μ. These types of equal particle size distributions are effective for use in formation zones, screens, gravel packs, or similar structures having pore sizes that range from 2μ to 5000μ. For formation zones, screens, gravel packs, or similar structures having a given pore size distribution, the strontium carbonate weighting and/or bridging agents may be tailored by adding different amount of each mode to substantially mimic the pore size distribution. In other embodiment, the strontium carbonate agent has a mono-modal distribution or a poly-modal distribution tailored to effectively plug a given pore size distribution of a formation, a screen, a gravel pack, or other similar structure.

BRIEF DESCRIPTION OF THE DRAWINGS

The invention can be better understood with reference to the following detailed description together with the appended illustrative drawings in which like elements are numbered the same.

DEFINITIONS OF TERM USED IN THE INVENTION

Figure 1:
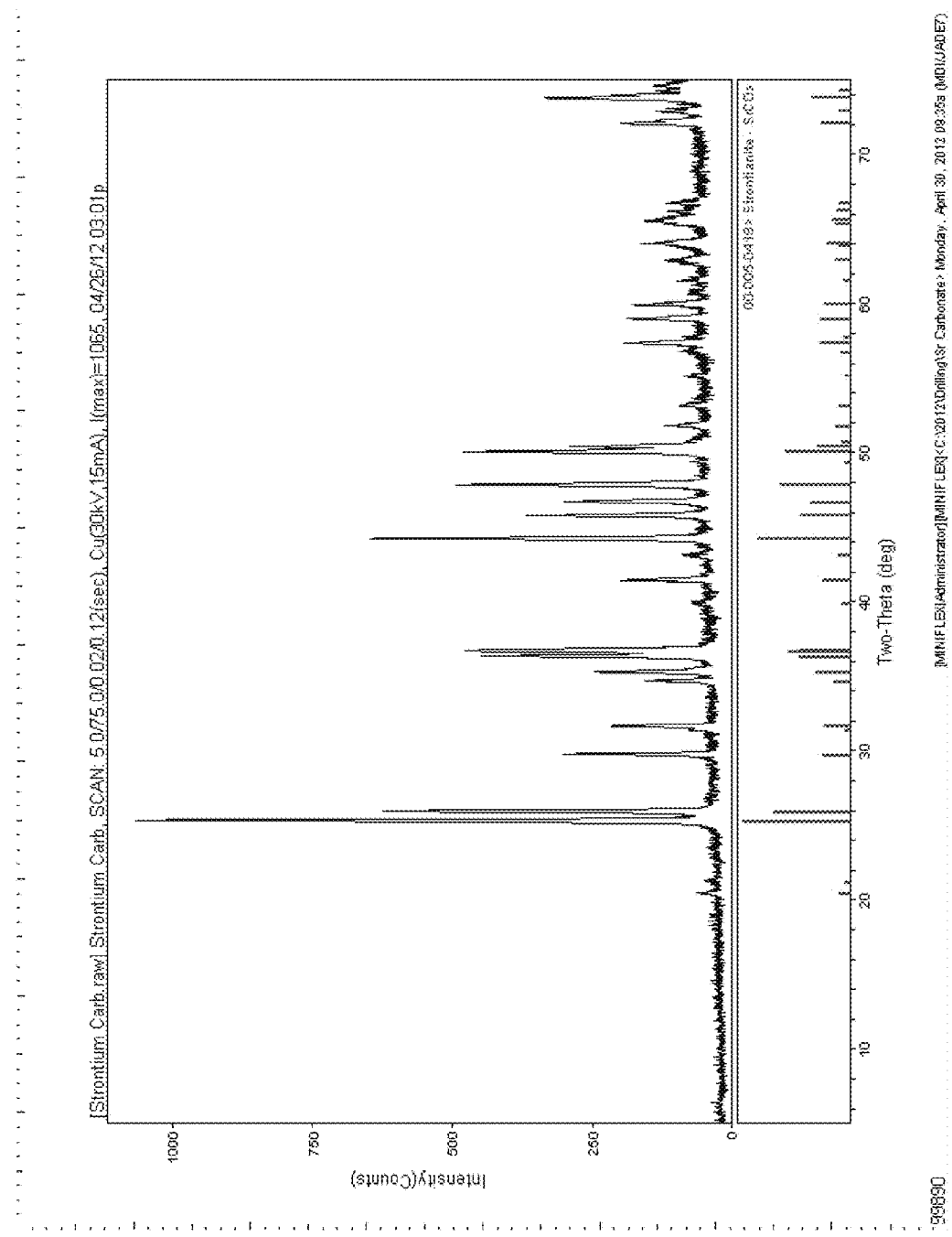
FIG. 1 depicts an XRD spectrum of strontium carbonate.

The following definitions are provided in order to aid those skilled in the art in understanding the detailed description of the present invention.

The term "mono-modal" particle size distribution means a particle size distribution having a single peak, which may be bell-shaped (Gaussian) or skewed to smaller or larger particle sizes.

The term "poly-modal" particle size distribution means a particle size distribution that includes more than one central peak. These distributions may be many peaks.

The term "equal or even" particle size distribution means a particle size distribution that has particles of all sizes within the range of the distribution which vary by no more that 20%. In other embodiments, an even or equal particle size distribution has particles of all sizes within the range of the distribution which vary by no more that 15%. In other embodiments, an even or equal particle size distribution has particles of all sizes within the range of the distribution which vary by no more that 10%. In other embodiments, an even or equal particle size distribution has particles of all sizes within the range of the distribution which vary by no more that 5%.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "drilling fluids" refers to any fluid that is used during well drilling operations including oil and/or gas wells, geo-thermal wells, water wells or other similar wells.

An over-balanced drilling fluid means a drilling fluid having a circulating hydrostatic density (pressure) that is greater than the formation density (pressure).

An under-balanced and/or managed pressure drilling fluid means a drilling fluid having a circulating hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additives may be included such as corrosion inhibitors, pH modifiers and/or a shale inhibitors.

The term "gpt" means gallons per thousand gallons.
The term "ppt" means pounds per thousand gallons.
The term "ppg" means pounds per gallon.
The term "HTHP" means high temperature, high pressure.
The term "HPHT" means high pressure, high temperature.

Detailed Description of the Invention

The inventors have found that strontium carbonate ($SrCO_3$) is a successful weighting agent for higher density reservoir drilling fluids (RDF). The inventors have found that strontium carbonate based higher density RDFs have better acid solubility than corresponding calcium carbonate based higher density RDFs in laboratory tests. The inventors have also fount that neat strontium carbonate based higher density RDFs have less than 1% acid insoluble content and are ideal suited for use as acid soluble bridging materials. The inventors have also found that filter cake formed using strontium carbonate based higher density RDFs are easily removed by HCl. The inventors have also found that the properties of the strontium carbonate based higher density RDFs may be optimized for or tuned to specific field applications. The inventor have also found that acetic acid was less effective in dissolving strontium carbonate based higher density RDFs filter cakes than HCl. Applicants believe that the dissolution rate may related to acid strength, with slower dissolution rates for weaker acids and faster dissolution rates for stronger acids. Thus, additional time is required for filter cake dissolution using weaker acids than stronger acids permitting fluid optimization and tailoring based on formation needs. The inventors have also found that fluid loss increases with fluid density. The inventors have also found that the amount of starch and biopolymers may be increased in the fluids to control fluid loss of the strontium carbonate based higher density RDFs. The inventors have also found that the fluid loss is temperature dependent and that for HP starch and biopolymers, temperatures above about 250° F. result reduced fluid loss as the starch and polymers appear to break down at temperatures greater than or equal to 200° F.

Fluids with basic components including Xanthan, starch, and strontium carbonate or calcium carbonate were successfully formulated in the lab up to a density of 13.3 ppg. The fluids showed acceptable rheological and fluid loss properties. The filter cakes formed by the fluids were easily cleaned by hydrochloric acid, while larger percentage of filter cake residue was observed with acetic acid after a 4 hour soak time. Surprisingly, filter cakes formed using strontium carbonate based higher density RDFs are easier to clean up than filter cakes formed using calcium carbonate based higher density RDFs.

A high density weighting material is required to build high density reservoir drilling fluid (RDF). The material has to have a high specific gravity, stable chemistry, and be removable by acids dissolution. The weighting material must also have a proper particle size and particle size distribution to generate optimal bridging to reduce fluid loss. Calcium carbonate is widely used in the industry as a bridging material for reservoir drilling fluid; however, it has a low gravity. Therefore, the density increase afforded by the addition of calcium carbonate to a drilling fluid is limited. Strontium carbonate was identified as a novel weighting/bridging material. It has similar properties to calcium carbonate, but it has high specific gravity 3.8 and surprisingly, dissolves in acids at a faster rate than calcium carbonate. We tested a strontium carbonate sample in the laboratory and demonstrated that strontium carbonate has several advantages over calcium carbonate as a weighting/bridging material for use in reservoir drilling fluids: 1) strontium carbonate has higher specific gravity of 3.8 as compared to 2.7 for calcium carbonate, 2) strontium carbonate filter cakes dissolve more readily in acids than calcium carbonate filter cakes making strontium carbonate easier to remove by acids after drilling, and 3) the ease of strontium carbonate filter cakes removal reduces skin damage of formation surfaces.

Strontium carbonate was determined to be a successful bridging agent for low, medium and high density RDF (reservoir drill-in fluids). Several fluids have been made, tested using fluid loss apparatus with specific pore sized ceramic disks, the filter cake has been dissolved using an acid breaker, and these ceramic disks have been tested using a device to measure the return permeability time. The ceramic disks permeability will differ before fluid loss and after filter cake clean-up; these two are compared to return a percentage, the return permeability.

Strontium carbonate fluids are seen to maintain a better suspension than the same formulation with calcium carbonate substituted, regardless of particle size. Calcium carbonate tends to fall out of solution after hot-rolling for 16 hours. A separation is usually seen after this time. Strontium carbonate showed no signs of separation in fluid after several days.

Rheology will have specified maximum and minimum values not to exceed which will be able to be adjusted by lowering the xanthan gum and starch content as need be. As the amount of strontium carbonate is increased beyond 12 ppg, the starch and even xanthan gum amount will be needed to decrease. Plastic viscosities will need to be maintained at a low while yield points should be maintained between 20 and 35. The general formulation is below. Strontium carbonate maintained a more similar rheology before hot-rolling as it did after hot-rolling compared to calcium carbonate. Calcium carbonate had a rheology before hot-rolling that exceeded the limit of yield point range.

Strontium carbonate has shown excellent fluid loss for a bridging material, as low as 2 milliliters after 30 minutes and less than 20 milliliters over a four-hour period. The fluid loss is administered using an assortment of several different sized ceramic disks to mimic the vast range of potential pore sizes in the field. The smaller the fluid loss, the smaller will be the filter cake, which will in turn make a shorter digestion time. It was seen originally that a sample of neat strontium carbonate has less than 1% acid insoluble and is ideal as an acid soluble agent. In drilling fluids strontium carbonate shows excellent bridging qualities as seen from the extremely low fluid loss. The filtercakes are easily cleaned using a dilute 15% hydrochloric acid. After filter cake cleanup using hydrochloric acid, a larger percentage of filtercake residue is observed using calcium carbonate than there is using strontium carbonate. Also, hydrochloric acid is used for faster breaker/filter cake cleanup than acetic acid digestion, due to it being a stronger acid. Acid breaker time was completed after a 4 hour digestion time with strontium carbonate and hydrochloric acid. Fluid loss is completed at a temperature of 150° F. with a 500 psi differential, rheology at 120° F. Acid digestion is also done at 150° F. and 100 psi. Strontium carbonate outperformed calcium carbonate in similar formulas when tested for fluid loss.

Fluids were designed using different sizes of strontium carbonate particles to optimize the bridging ability.

These strontium carbonate reservoir drill-in fluids are made in both water-based as well as synthetic-based fluids. The basic components in both types of fluids will be additives such as xanthan gum, starch and strontium carbonate and have been successfully formulated in the lab up to 17 ppg. These fluids show ideal rheological and fluid loss properties.

Tests have been run to check whether the strontium carbonate is harmful to the environment, specifically via a total characteristic leeching procedure. This test, after administered showed a low sign of any hazardous leeching, far below the standard set by the Environmental Protection Agency.

Overall, strontium carbonate shows to be an acceptable substitute for calcium carbonate and to even exceed calcium carbonate in many instances. Below are first the original results obtained for strontium carbonate followed by the newest most recent data generated in the lab.

Compositional Ranges

In drilling fluid embodiments, the base fluid compositions of this invention are used in a range between about 1 vol. % and about 100 vol. % (volume, v/volume, v) of the base fluid (the base fluid is the fluid into which all other components of the final fluid are added). In other embodiments, the base fluids are used in a range between about 10 vol. % and about 90 vol. %. In other embodiments, the base fluids are used in a range between about 30 and about 70 vol. %. In other embodiments, the base fluids are used in a range between about 40 vol. % and about 60 vol. %. In other embodiments, the base fluids make up greater than or equal to about 50 vol. % of the base fluid. In other embodiments, the base fluids make up greater than or equal to about 60 vol. % of the base fluid. In other embodiments, the base fluids make up greater than or equal to about 70 vol. % of the base fluid. In other embodiments, the base fluids make up greater than or equal to about 80 vol. % of the base fluid. In other embodiments, the base fluids make up greater than or equal to about 90 vol. % of the base fluid. In other embodiments, the base fluids make up about 100 vol. % of the base fluid.

Suitable Reagents

Aqueous Based Fluids

Suitable aqueous base fluids for use in this invention includes, without limitation, freshwater, production water, seawater other sodium brines, non-sodium brines (phosphate, sulfate, nitrate, etc.), aqueous makeup systems, and mixture or combinations thereof.

Organic Base Fluids

Suitable oil based fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5\times10^{-6}$ to about $600\times10^{-6}$ m$^2$/s (5 to about 600 centistokes). Exemplary examples of such hydrocarbon fluids include, without limitation, polyalphaolefins, polybutenes, polyolesters, vegetable oils, animal oils, other essential oil, diesel having a low or high sulfur content, kerosene, jet-fuel, internal olefins (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Limpar, Linear paraffins, detergent alkylates and Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include blends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5\times10^{-6}$ to about $600\times10^{-6}$ m$^2$/s (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet.

Exemplary examples of vegetable oils include, without limitation, castor oils, corn oil, olive oil, sunflower oil, sesame oil, peanut oil, other vegetable oils, modified vegetable oils such as cross linked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Suitable base fluid compositions or solvent systems of this invention include, without limitation, blends of biodegradable, non-toxic, non-hazardous solvents including biodegradable paraffins, isoparaffins, olefins, naphthenes, esters, and oxygenates having a flashpoint $\geq 80°$ C. and a pour point of about 19° F. Exemplary examples include HF-1000™, ODC®, LPA®, terpenes and mixture of terpenes derived from citrus plants including d-limonenes, orange terpenes, lemon terpenes, grapefruit terpenes, orange oil, lemon oil, other citrus terpenes, other citrus oils, blends of HF-1000™, ODC®, and/or LPA® with the terpenes and mixtures of terpenes or mixtures and combinations thereof.

Particle Size Distributions of Strontium Carbonate Weighting and/or Bridging Agents Suitable strontium carbonate weighting agents include, without limitation, particulate strontium carbonates. In certain embodiments, the particle size for the strontium weighting agents is less than or equal to about $5000\mu$ (micron), where the particle size distribution is mono-modal, bi-modal, poly-modal or equally distributed (all particles sized equally represented). In other embodiments, the particle size for the strontium weighting agents is less than or equal to about $4000\mu$, where the particle size distribution is mono-modal, bi-modal, poly-modal or equally distributed (all particles sized equally represented). In other embodiments, the particle size for the strontium weighting agents is less than or equal to about $3000\mu$, where the particle size distribution is mono-modal, bi-modal, poly-modal or equally distributed (all particles sized equally represented). In other embodiments, the particle size for the strontium weighting agents is less than or equal to about $2000\mu$, where the particle size distribution is mono-modal, bi-modal, poly-modal or equally distributed (all particles sized equally represented). In other embodiments, the particle size for the strontium weighting agents is less than or equal to about $5000\mu$, where the particle size distribution is mono-modal, bi-modal, poly-modal or equally distributed (all particles sized equally represented). In other embodiments, the particle size for the strontium weighting agents is less than or equal to about $500\mu$, where the particle size distribution is mono-modal, bi-modal, poly-modal or equally distributed (all particles sized equally represented). In other embodiments, the particle size for the strontium weighting agents is less than or equal to about $250\mu$, where the particle size distribution is mono-modal, bi-modal, poly-modal or equally distributed (all particles sized equally represented). In other embodiments, the particle size for the strontium weighting agents is less than or equal to about $100\mu$, where the particle size distribution is mono-modal, bi-modal, poly-modal or equally modality distributed (all particles sized equally represented). In other embodiments, the particle size for the strontium weighting agents is less than or equal to about $50\mu$, where the particle size distribution is mono-modal, bi-modal, poly-modal or equally distributed (all particles sized equally represented). Strontium carbon may be purchased from at least Solvay Chemicals of Nuevo Leon, Mexico, Spectrum Chemicals & Laboratory Products, Shanghai Yixin Chemical Co., Ltd, Red Butterfly Strontium Industry Co., Ltd., GFS Chemicals, Inc., Columbus, Ohio, All-Chemie, Ltd., Mount Pleasant, S.C., City Chemical LLC, West Haven, Conn., Mil-Spec Industries Corp, Roslyn Heights, N.Y., NOAH Technologies Corporation, San Antonio, Tex., Service Chemical, Inc., Hatfield, Pa., Allan Chemical Corp., Ringwood, N.J., Barium & Chemicals, Inc., Steubenville, Ohio, Del Amo Chemical Co., Gardena, Calif., Espicorp Inc., Ashland, Oreg. Mallinckrodt, Inc., Hazelwood, Mo. Arlington International, Inc., Fort Collins, Colo., and Seaforth Mineral & Ore Co., Inc., Cleveland, Ohio.

In certain embodiments, the particles are $\leq 5000\mu$ and the distribution in mono-modal-Gaussian distribution centered at a desired value less than or equal to $2500\mu$. In other embodiments, the particles are $\leq 4000\mu$ and the distribution in mono-modal-Gaussian distribution centered at a desired value less than or equal to $2000\mu$. In other embodiments, the particles are $\leq 3000\mu$ and the distribution in mono-modal-Gaussian distribution centered at a desired value less than or equal to $1500\mu$. In other embodiments, the particles are $\leq 2000\mu$ and the distribution in mono-modal-Gaussian distribution centered at a desired value less than or equal to $1000\mu$. In other embodiments, the particles are $\leq 1000\mu$ and the distribution in mono-modal-Gaussian distribution centered at a desired value less than or equal to $500\mu$. In other embodiments, the particles are $\leq 500\mu$ and the distribution in mono-modal-Gaussian distribution centered at a desired value less than or equal to $250\mu$. In other embodiments, the particles are $\leq 250\mu$ and the distribution in mono-modal-Gaussian distribution centered at a desired value less than or equal to $150\mu$. In other embodiments, the particles are $\leq 100\mu$ and the distribution in mono-modal-Gaussian distribution centered at a desired value less than or equal to $50\mu$. In other embodiments, the particles are $\leq 50\mu$ and the distribution in mono-modal-Gaussian distribution centered at a desired value less than or equal to $25\mu$.

Suitable strontium carbonate bridging agents include, without limitation, particulate strontium carbonate having particles size ranging between about $2\mu$ and about $5000\mu$. The particulate strontium carbonate bridging agents may have a mono-modal, bi-modal, poly-modal or equally distributed modality (all particles sized equally represented). In certain embodiments, the bridging agents include strontium carbonate having a particle size distribution D50 of $2\mu$, $10\mu$, $20\mu$, $50\mu$, $100\mu$, $200\mu$, $500\mu$, $1000\mu$, $2000\mu$, $3000\mu$, $4000\mu$ and $5000\mu$, or mixtures and combination thereof. The separate strontium carbonate agents may then be used separately or combined together to produce a desired particle size distribution (PSD) having particles ranging between about $2\mu$ and $1000\mu$ for appropriate bridging products. If the pore size distribution of the formation zone, the screen, the gravel pack, sand pack, or other structure is known or was determined, then the strontium carbonate weighting and/or bridging agent may be tailored by adding different amount of the different modes of strontium carbonate to mimic or substantially mimic the pore size distribution.

It should be recognized that each strontium carbonate material has a particle distribution determined by its D50. When preparing a given distribution of strontium carbonate particles, the amount of each material mixed to from the distribution will have to be adjusted so that the given distribution may be prepared.

Thickening Agents

Suitable hydratable polymers that may be used in embodiments of the invention include any of the hydratable polysaccharides. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Exemplary examples of hydratable polymers include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The polymer may be a hydrolyzed polyacrylamide polymer. The polymer can be a scleroglucan, a modified scleroglucan, or a scleroglucan modified by contact with glyoxal or glutaraldehyde. The scleroglucans are nonionic water-soluble homopolysaccharides, or water-soluble anionic polysaccharides, having molecular weights in excess of about 500,000, the molecules of which consist of a main straight chain formed of D-glucose units which are bonded by β-1,3-bonds and one in three of which is bonded to a side D-glucose unit by means of a β-1,6 bond. These polysaccharides can be obtained by any of the known methods in the art, such as fermentation of a medium based on sugar and inorganic salts under the action of a microorganism of Sclerotium type A. A more complete description of such scleroglucans and their preparations may be found, for example, in U.S. Pat. Nos. 3,301,848 and 4,561,985, incorporated herein by reference. In aqueous solutions, the scleroglucan chains are combined in a triple helix, which explains the rigidity of the biopolymer, and consequently its features of high viscosity-increasing power and resistance to shearing stress.

It is possible to use, as source of scleroglucan, the scleroglucan which is isolated from a fermentation medium, the product being in the form of a powder or of a more or less concentrated solution in an aqueous and/or aqueous-alcoholic solvent. Scleroglucans customarily used in applications in the petroleum field are also preferred according to the present invention, such as those which are white powders obtained by alcoholic precipitation of a fermentation broth in order to remove residues of the producing organism (mycelium, for example). Additionally, it is possible to use the liquid reaction mixture resulting from the fermentation and containing the scleroglucan in solution. According to the present invention, further suitable scleroglucans are the modified scleroglucan which result from the treatment of scleroglucans with a dialdehyde reagent (glyoxal, glutaraldehyde, and the like), as well as those described in U.S. Pat. No. 6,162,449, incorporated herein by reference, (β-1,3-scleroglucans with a cross-linked 3-dimensional structure produced by Sclerotium rolfsii).

The polymer can be Aquatrol V (a synthetic compound which reduces water production problems in well production; described in U.S. Pat. No. 5,465,792, incorporated herein by reference), AquaCon (a moderate molecular weight hydrophilic terpolymer based on polyacrylamide capable of binding to formation surfaces to enhance hydrocarbon production; described in U.S. Pat. No. 6,228,812, incorporated herein by reference) and Aquatrol C (an amphoteric polymeric material). Aquatrol V, Aquatrol C, and AquaCon are commercially available from BJ Services Company.

As indicated, mixtures of polymeric gel forming material or gellants may be used. Materials which may be used include water soluble crosslinkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), ammonium and alkali metal salts thereof, and mixtures thereof. Preferred water soluble crosslinkable polymers include hydroxypropyl guar, carboxymethylhydroxypropyl guar, partially hydrolyzed polyacrylamides, xanthan gum, polyvinyl alcohol, the ammonium and alkali metal salts thereof, and mixtures thereof.

The hydratable polymer may be present in the fluid in concentrations ranging from about 0.10 wt. % to about 5.0 wt. % of the aqueous fluid. In certain embodiments, the hydratable polymer are present in concentrations ranging from about 0.20 wt. % to about 0.80 wt. %.

The pH of an aqueous fluid which contains a hydratable polymer may be adjusted as needed depending on the application. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. In certain embodiments, the pH is kept neutral or basic, i.e., from about 7 to about 14, more preferably between about 8 to about 12.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, $C_6$ to $C_{24}$ synthetic tertiary amines, amines derived from natural products such as coconuts, or the like, dialkyl-substituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: $C_1$ to $C_8$ monocarboxylic acids such as formic acid, acetic acid, propanoic acid, butanoic acid, pentanoic acid, hexanoic acid, heptanoic acid, octanoic acid, 2-ethylhexanoic acid, or the like; $C_2$ to $C_{12}$ dicarboxylic acids, $C_2$ to $C_{12}$ unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., $Na^+$, $K^+$ or $NH_4^+$ salts of EDTA; $Na^+$, $K^+$ or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxyethylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy propylamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples of oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus-Nitrilotriacetamide available from Clearwater International, LLC of Houston, Tex.

Experiments of the Invention

Testing Parameters

Determine whether Strontium Carbonate is an acceptable substitute for Calcium Carbonate. Tests were run to check acid solubility of neat product, flow properties, fluid loss values as compared to standard RDF (1 ppb HP Starch, 25 ppb calcium fine carbonate), and drilling fluid filter cake constructed with product. Basic rheology at 120° F., HTHP at 180° F. and 250° F., API and HTHP cake thicknesses should be checked.

Determine if the $SrCO_3$ has any solubility issues with potassium formate, like barite has shown.

Characterization of the Strontium Carbonate Sample

Sample Identification

Strontium Carbonate, white powder, supplied by Solvay.

XRD

The sample was characterized as strontium carbonate by XRD as shown in FIG. 1.

Specific Gravity

Figure 2:
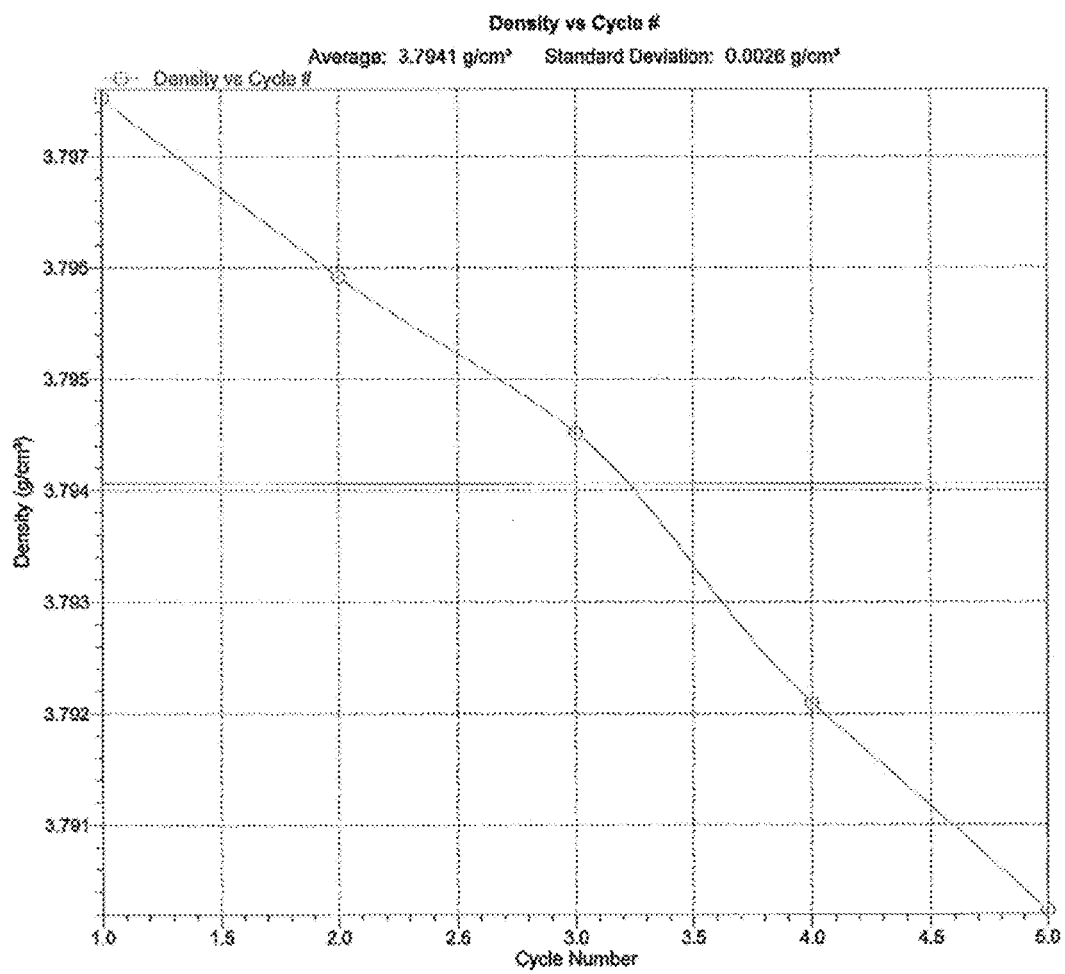
FIG. 2 depicts a determination of strontium carbonate specific gravity using gas pycnometer at 25° C.

The specific gravity was determined to be 3.7941 by gas pycnometer at 25° C. as shown in FIG. 2.

Particle Size Distribution (PSD)

Figure 3:
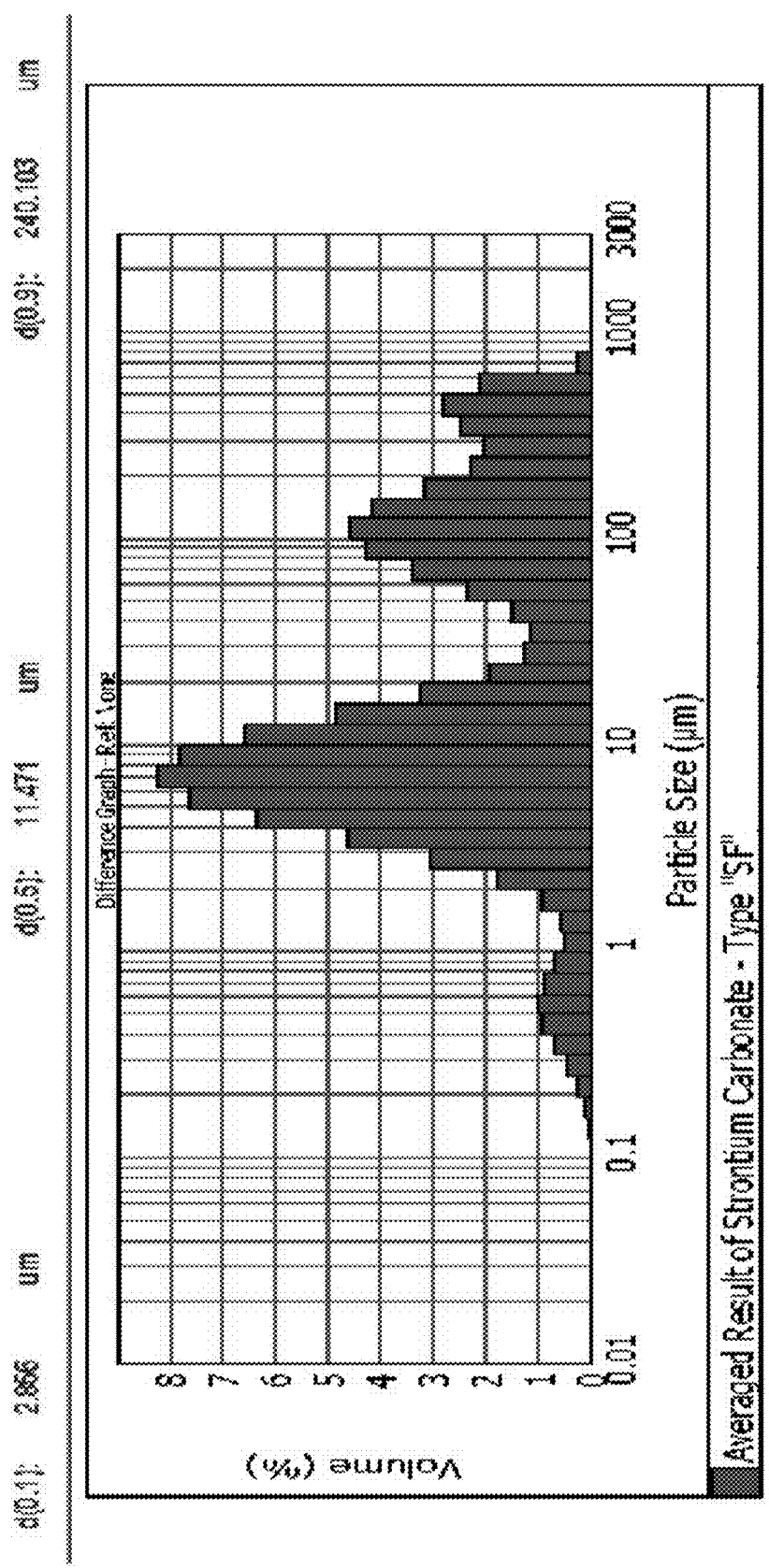
FIG. 3 depicts the particle size distribution (PSD) of the strontium carbonate used in the invention.

The PSD was determined by Mastersizer 2000. D50 is 11.5μ (μm) and D90 is 240μ. It is noticed that the distribution has multiple peaks at 0.5μ, 8μ and 100μ as shown in FIG. 3.

Acid Solubility of Neat Strontium Carbonate

A neat sample of both $SrCO_3$ and $CaCO_3$ were reacted with acetic and hydrochloric acids at room temperature. The acid insoluble solids were separated by centrifuge and weighted after drying. The $SrCO_3$ was provided by Solvay. The $CaCO_3$ used was 325-mesh.

In this experiment, neat $SrCO_3$ and $CaCO_3$ samples were tested at two different carbonate to acid ratios: 1:4 and 1:2. The acid insoluble solid in the strontium carbonate sample at the carbonate to acid ratio of 1:4 was determined to be below 0.7 wt. % as tabulated in Table I. The acid insoluble solid in the strontium carbonate sample at the carbonate to acid ratio of 1:4 was determined to be below 0.7 wt. % as tabulated in Table II.

TABLE I

| Acid Insoluble - 1:4 Molar Ratios (Carbonate:Acid) | | |
| --- | --- | --- |
| Weighting Agent | HCl (15% wt) | AcOH (10% wt) |
| $SrCO_3$ | 0.64% | 0.61% |
| $CaCO_3$ | 0.54% | 1.17% |

TABLE II

| Acid Insoluble - 1:2 Molar Ratios (Carbonate:Acid) | | |
| --- | --- | --- |
| Amount Insoluble in Grams | HCl (15% wt) | AcOH (20% wt) |
| $SrCO_3$ | 3.36% | 49.25% |
| $CaCO_3$ | 7.81% | 17.57% |

The data indicated that at a 1:4 mole ratio of strontium carbonate to acid, strontium carbonate is easier to clean-up than calcium carbonate, while at a strontium carbonate to acid mole ratio of 1:2, strontium carbonate is easier to clean-up in HCl than calcium carbonate, but harder to clean-up in acetic acid. Thus, drilling fluid including strontium carbonate as the weighting agent, will produce filter cakes that are readily dissolvable in acid solutions having a strontium carbonate to acid mole ratio of greater than 1:3, when pumped into a completed well. In certain embodiments, the acid solutions have a strontium carbonate to acid mole ratio of greater than 1:4, when pumped into a completed well.

Rheological and Acid Stability Properties of Strontium Carbonate Containing RDFs Strontium carbonate RDFs having densities between 8.78 ppg to 13.28 ppg incremented by 0.5 ppg were prepared and tested. The rheology, API, HPHT at both 180° F. and 250° F., HPHT filter cake thickness at both temperatures were measured from all samples. The acid solubility in 20% acetic and 18.9% hydrochloric acids were tested as a percent of filter cake residue after acid exposure.

Tables IIIA&B tabulated the rheological properties of strontium carbonate based RDFs Examples S1, S3, S4, and S6 having densities of 8.78 ppg, 9.78 ppg, 10.28 ppg, and 12.78 ppg, respectively.

TABLE IIIA

| $SrCO_3$ RDF Compositions of Examples S1, S3, S4, and S6 | | | | | |
| --- | --- | --- | --- | --- | --- |
| | | Example | | | |
| Constituent | Sp. Gr. | S1 8.78 ppg | S3 9.78 ppg | S4 10.28 ppg | S6 11.28 ppg |
| Water | 1.00 | 337.00 | 322.00 | 314.50 | 299.50 |
| Sodium Carbonate | 2.69 | 0.50 | 0.50 | 0.50 | 0.50 |
| Caustic Soda | 2.10 | 0.25 | 0.25 | 0.25 | 0.25 |
| WEL-ZAN D | 1.55 | 1.00 | 1.00 | 1.00 | 1.00 |
| HP Starch (Cargill) | 1.50 | 5.00 | 5.00 | 5.00 | 5.00 |
| WEL-CARB | 2.71 | 8.00 | 25.00 | 8.00 | 8.00 |
| Strontium Carbonate | 3.80 | 0.00 | 57.00 | 85.50 | 142.50 |
| Total Mass | | 351.75 | 410.75 | 414.75 | 456.75 |
| Total Volume | | 344.24 | 350.51 | 344.24 | 344.24 |
| specific gravity | | 1.02 | 1.17 | 1.20 | 1.33 |

TABLE IIIB

Rheological Properties of Examples S1, S3, S4, and S6

| | Example | | | | | | | |
|---|---|---|---|---|---|---|---|---|
| | S1 | | S3 | | S4 | | S6 | |
| Hot Rolling (16 hrs) | BHR | AHR | BHR | AHR | BHR | AHR | BHR | AHR |
| Viscometer Temp | 120 | 120 | 120 | 120 | 120 | 120 | 120 | 120 |
| 600 rpm | 36 | 37 | 50 | 52 | 52 | 54 | 68 | 70 |
| 300 rpm | 26 | 28 | 41 | 38 | 39 | 41 | 53 | 55 |
| 200 rpm | 23 | 25 | 32 | 33 | 34 | 36 | 47 | 48 |
| 100 rpm | 18 | 20 | 24 | 26 | 27 | 29 | 36 | 39 |
| 6 rpm | 7 | 9 | 9 | 11 | 11 | 12 | 15 | 17 |
| 3 rpm | 6 | 7 | 7 | 9 | 10 | 10 | 13 | 14 |
| GELS 10" | 6 | 6 | 6 | 8 | 8 | 9 | 12 | 13 |
| GELS 10' | 7 | 7 | 8 | 9 | 9 | 10 | 13 | 13 |
| APPARENT VISC. | 18 | 19 | 25 | 26 | 26 | 27 | 34 | 35 |
| PLASTC VISC. | 10 | 9 | 9 | 14 | 13 | 13 | 15 | 15 |
| YIELD POINT | 16 | 19 | 32 | 24 | 26 | 28 | 38 | 40 |
| API | 5.1 | | 3.6 | | 3.3 | | 3.8 | |
| Fluid Loss Temp. (° F.) | 180° F. | 250° F. | 180° F. | 250° F. | 180° F. | 250° F. | 180° F. | 250° F. |
| HTHP Fluid Loss | 14.4 | 33 | 13.4 | 44 | 17.2 | 65 | 22 | 91 |
| Cake thicknes (in.) | 1/32" | 2/32" | 1/32" | 4/32" | 1/32" | 6/32" | 3/32" | 14/32" |
| pH | 11.3 | | 11.6 | | 12.0 | | 11.6 | |
| specific gravity (SG) | 1.01 | | 1.15 | | 1.23 | | 1.34 | |

Tables IVA&B tabulated the rheological properties of strontium carbonate based RDFs Examples S7, S9, S11, and S12 having densities of 11.78 ppg, 10.28 ppg, 13.28 ppg, and 10.28 ppg, respectively.

TABLE IVA

SrCO$_3$ RDF Compositions of Examples S7, S9, S11, and S12

| | | Example | | | |
|---|---|---|---|---|---|
| Constituent | Sp. Gr. | S7 11.78 ppg | S9 10.28 ppg | S11 13.28 ppg | S12 10.28 ppg |
| Water | 1.00 | 292.00 | 300.10 | 269.50 | 314.50 |
| Sodium Carbonate | 2.69 | 0.50 | 0.50 | 0.50 | 0.50 |
| Caustic Soda | 2.10 | 0.25 | 0.25 | 0.25 | 0.25 |
| WEL-ZAN D | 1.55 | 1.00 | 1.00 | 1.00 | 1.00 |
| HP Starch (Cargill) | 1.50 | 5.00 | 5.00 | 5.00 | 5.00 |
| WEL-CARB | 2.71 | 8.00 | 125.00 | 25.00 | 25.00 |
| Strontium Carbonate | 3.80 | 171.00 | 0.00 | 256.50 | 85.50 |
| Total Mass | | 477.75 | 431.85 | 557.75 | 431.75 |
| Total Volume | | 344.24 | 350.51 | 350.51 | 350.51 |
| specific gravity (SG) | | 1.39 | 1.23 | 1.59 | 1.23 |

TABLE IVB

Rheological Properties of Examples S7, S9, S11, and S12

| | Example | | | | | | | |
|---|---|---|---|---|---|---|---|---|
| | S7 | | S9 | | S11 | | S12 | |
| Hot Rolling (16 hrs) | BHR | AHR | BHR | AHR | BHR | AHR | BHR | AHR |
| Viscometer Temp (° F.) | 120 | 120 | 120 | 120 | 120 | 120 | 120 | 120 |
| 600 rpm | 77 | 77 | 70 | 73 | 119 | 118 | 53 | 56 |
| 300 rpm | 60 | 60 | 56 | 62 | 92 | 91 | 39 | 44 |
| 200 rpm | 52 | 53 | 50 | 57 | 82 | 80 | 36 | 40 |
| 100 rpm | 42 | 43 | 42 | 48 | 65 | 64 | 27 | 31 |
| 6 rpm | 20 | 20 | 19 | 24 | 32 | 32 | 11 | 14 |
| 3 rpm | 17 | 17 | 16 | 22 | 28 | 28 | 9 | 11 |
| GELS 10" | 14 | 15 | 16 | 21 | 27 | 27 | 8 | 12 |
| GELS 10' | 16 | 16 | 15 | 21 | 33 | 28 | 9 | 32 |
| APPARENT VISC. | 39 | 39 | 35 | 37 | 60 | 59 | 27 | 46 |
| PLASTC VISC. | 17 | 17 | 14 | 11 | 27 | 27 | 14 | 12 |
| YIELD POINT | 43 | 43 | 42 | 51 | 65 | 64 | 25 | 32 |
| API | 4.2 | | 4.8 | | 6.5 | | 4.4 | |
| Fluid Loss Temp. (° F.) | 180° F. | 250° F. | 180° F. | 250° F. | 180° F. | 250° F. | 180° F. | 250° F. |
| HTHP Fluid Loss | 30 | 138 | 25 | 34 | 82 | 147 | 47 | 63 |

TABLE IVB-continued

Rheological Properties of Examples S7, S9, S11, and S12

| Hot Rolling (16 hrs) | S7 BHR | S7 AHR | S9 BHR | S9 AHR | S11 BHR | S11 AHR | S12 BHR | S12 AHR |
|---|---|---|---|---|---|---|---|---|
| Cake thicknes (in.) | 5/32" | 19/32" | 4/32" | 6/32" | 18/32" | 28/32" | 8/32" | 12/32" |
| pH | 11.2 | | 12.0 | | 11.7 | | 11.5 | |
| specific gravity (SG) | 1.43 | | 1.25 | | 1.53 | | 1.21 | |

Tables VA&B tabulated the fluid compositions and the dissolution data in 18.9% hydrochloric acid. Examples S2, S5, S8, and S10 having densities of 9.28 ppg, 10.78 ppg, 12.28 ppg, and 13.28 ppg, respectively, were chosen to digest in both hydrochloric acid and acetic acid.

TABLE VA

SrCO₃ RDF Compositions of Examples S2, S5, S8, and S10

| Constituent | Sp. Gr. | S2 9.28 ppg | S5 10.78 ppg | S8 12.28 ppg | S10 13.28 ppg |
|---|---|---|---|---|---|
| Water | 1.00 | 329.37 | 306.95 | 284.50 | 277.00 |
| Sodium Carbonate | 2.69 | 0.50 | 0.50 | 0.50 | 0.50 |
| Caustic Soda | 2.10 | 0.25 | 0.25 | 0.25 | 0.25 |
| WEL-ZAN D | 1.55 | 1.00 | 1.00 | 1.00 | 1.00 |
| HP Starch (Cargill) | 1.50 | 5.00 | 5.00 | 5.00 | 5.00 |
| WEL-CARB | 2.71 | 25.00 | 25.00 | 25.00 | 25.00 |
| Strontium Carbonate | 3.80 | 29.00 | 114.20 | 199.50 | 228.00 |
| Total Mass | | 390.12 | 435.90 | 515.75 | 536.75 |
| Total Volume | | 350.51 | 344.16 | 350.51 | 350.51 |
| specific gravity (SG) | | 1.11 | 1.27 | 1.47 | 1.53 |

TABLE VB

Hydrochloric Acid Dissolution Properties of Examples S2, S5, S8, and S10

| | S2 BHR | S2 AHR | S5 BHR | S5 AHR | S8 BHR | S8 AHR | S10 BHR | S10 AHR |
|---|---|---|---|---|---|---|---|---|
| Hot Rolling (16 hrs) | | | | | | | | |
| Viscometer Temp | 120 | 120 | 120 | 120 | 120 | 120 | 120 | 120 |
| 600 rpm | 43 | 46 | 63 | 61 | 88 | 88 | 103 | 111 |
| 300 rpm | 32 | 34 | 44 | 47 | 85 | 68 | 82 | 87 |
| 200 rpm | 28 | 29 | 38 | 41 | 70 | 60 | 71 | 77 |
| 100 rpm | 21 | 23 | 31 | 34 | 59 | 48 | 57 | 61 |
| 6 rpm | 8 | 10 | 13 | 15 | 29 | 23 | 28 | 32 |
| 3 rpm | 7 | 8 | 11 | 12 | 26 | 19 | 25 | 27 |
| GELS 10" | 6 | 7 | 10 | 12 | 18 | 19 | 23 | 26 |
| GELS 10' | 7 | 8 | 10 | 12 | 18 | 19 | 26 | 27 |
| APPARENT VISC. | 22 | 23 | 32 | 31 | 44 | 44 | 52 | 56 |
| PLASTC VISC. | 11 | 12 | 19 | 14 | 3 | 20 | 21 | 24 |
| YIELD POINT | 21 | 22 | 25 | 33 | 82 | 48 | 61 | 63 |
| API | 4.2 | | 3.6 | | 4.9 | | 6.1 | |
| Fluid Loss Temp. (° F.) | 180° F. | 250° F. | 180° F. | 250° F. | 180° F. | 250° F. | 180° F. | 250° F. |
| HTHP Fluid Loss | 14 | 45 | 21 | 66 | 41 | 154 | 110 | 154 |
| Cake Thickness (in.) | 2/32" | 4/32" | 2/32" | 11/32" | 6/32" | 26/32" | 17/32" | 24/32" |
| pH | 11.4 | | 11.7 | | 11.9 | | 12.0 | |
| 18.9% HCl needed | 172 | | 394 | | 618 | | 689 | |
| Specific Gravity | 1.10 | | 1.28 | | 1.49 | | 1.48 | |

| HPHT filter temp @ 4 hr | B (g) | A (g) | B (g) | A (g) | B (g) | A (g) | B (g) | A (g) |
|---|---|---|---|---|---|---|---|---|
| 180° F.-RT | 5.79 | 0.0176 | 7.65 | 0.0093 | 14.5 | 0.0051 | 44.38 | 0.0815 |
| 180° F.-120° F. | 5.84 | 0.0215 | 6.75 | 0.0356 | 15.73 | 0.003 | 39.42 | 0.0663 |
| 250° F.-RT | 10.96 | 0.0129 | 26.32 | 0.0371 | 48.73 | 0.073 | 62.01 | 0.1752 |
| 250° F.-120° F. | 9.81 | 0.0311 | 20.65 | 0.027 | 59.34 | 0.0798 | 63.53 | 0.1803 |
| 180° F.-RT | 0.30% | | 0.12% | | 0.04% | | 0.18% | |
| 180° F.-120° F. | 0.37% | | 0.53% | | 0.02% | | 0.17% | |
| 250° F.-RT | 0.12% | | 0.14% | | 0.15% | | 0.28% | |
| 250° F.-120° F. | 0.32% | | 0.13% | | 0.13% | | 0.28% | |

Tables VIA&B and table is dissolution in 20% acetic acid. Examples S2, S5, S8, and S10 having densities of 9.28 ppg, 10.78 ppg, 12.28 ppg, and 13.28 ppg, respectively. The one cell below in the 12.78 ppg mud had a much larger fluid loss than expected; this was most likely due to a temperature fluctuation while heating the cell.

TABLE VIA $SrCO_3$ RDF Compositions of Examples S2, S5, S8, and S10

| Constituents | Sp. Gr. | Example S2 9.28 ppg | S5 10.78 ppg | S8 12.28 ppg | S10 13.28 ppg |
|---|---|---|---|---|---|
| Water | 1.00 | 329.37 | 306.95 | 284.50 | 277.00 |
| Sodium Carbonate | 2.69 | 0.50 | 0.50 | 0.50 | 0.50 |
| Caustic Soda | 2.10 | 0.25 | 0.25 | 0.25 | 0.25 |
| WEL-ZAN D | 1.55 | 1.00 | 1.00 | 1.00 | 1.00 |
| HP Starch (Cargill) | 1.50 | 5.00 | 5.00 | 5.00 | 5.00 |
| WEL-CARB | 2.71 | 25.00 | 25.00 | 25.00 | 25.00 |
| Strontium Carbonate | 3.80 | 29.00 | 114.20 | 199.50 | 228.00 |
| Total Mass | | 390.12 | 452.90 | 515.75 | 536.75 |
| Total Volume | | 350.51 | 350.51 | 350.51 | 350.51 |
| Sp. Gr. Calc. | | 1.11 | 1.29 | 1.47 | 1.53 |

The $CaCO_3$ used in the formulations was 325-mesh ExCal CW $CaCO_3$ except the 10.28 ppg fluid, which used 50:50 blends of 325-mesh ExCal CW $CaCO_3$ and 200-mesh ExCal $CaCO_3$. From the TDS of these two carbonates it shows that the 200-mesh has 1.3% impurity of $SiO_2$, whereas the 325-mesh contains <0.01% $SiO_2$. This may be the cause of the greater insolubility of the carbonate in the purely $CaCO_3$ RDF compared with the 10.28 ppg $SrCO_3$ RDF. The results are shown in the following tables.

Two RDFs, both at 10.28 ppg, one using only $CaCO_3$ and the other using only $SrCO_3$ as the weighting agent were compared.

A strontium carbonate RDF and a calcium carbonate RDF having the density of 10.28 ppg were produced to compare the rheology and acid solubility properties. As one can see, the fluid loss is much greater in the formulation with $SrCO_3$; however, the rheology is slightly lower and the acid solubility is much greater. The high fluid loss may due to the PSD of strontium carbonate. The results of the tests are tabulated in Table VIIA&B.

TABLE VIB

Acetic Acid Dissolution Properties of Examples S2, S5, S8, and S10

| | Example S2 | | S5 | | S8 | | S10 | |
|---|---|---|---|---|---|---|---|---|
| Hot Rolling (16 hrs) | BHR | AHR | BHR | AHR | BHR | AHR | BHR | AHR |
| Viscometer Temp | 120 | 120 | 120 | 120 | 120 | 120 | 120 | 120 |
| 600 rpm | 45 | 47 | 59 | 62 | 90 | 93 | 103 | 108 |
| 300 rpm | 35 | 36 | 46 | 49 | 70 | 72 | 79 | 83 |
| 200 rpm | 30 | 32 | 40 | 44 | 61 | 64 | 68 | 72 |
| 100 rpm | 22 | 25 | 32 | 36 | 48 | 52 | 55 | 58 |
| 6 rpm | 9 | 10 | 13 | 16 | 22 | 24 | 28 | 28 |
| 3 rpm | 7 | 8 | 11 | 13 | 19 | 25 | 24 | 25 |
| GELS 10" | 7 | 8 | 10 | 13 | 17 | 21 | 23 | 25 |
| GELS 10' | 8 | 8 | 10 | 13 | 20 | 21 | 26 | 26 |
| APPARENT VISC. | 23 | 24 | 30 | 31 | 45 | 47 | 52 | 54 |
| PLASTC VISC. | 10 | 11 | 13 | 13 | 20 | 21 | 24 | 25 |
| YIELD POINT | 25 | 25 | 33 | 36 | 50 | 51 | 55 | 58 |
| API | 4.2 | | 3.6 | | 4.9 | | 6.1 | |
| Fluid Loss Temp. (° F.) | 180° F. | 250° F. | 180° F. | 250° F. | 180° F. | 250° F. | 180° F. | 250° F. |
| HTHP Fluid Loss | 12 | 52 | 18 | 82 | 27 | 144 | 38 | 140 |
| Cake Thickness (in.) | 2/32" | 7/32" | 6/32" | 13/32" | 9/32" | 23/32" | 10/32" | 26/32" |
| pH | 11.4 | | 11.7 | | 11.9 | | 12.0 | |
| 20% AcOH needed | 268 g | | 571 g | | 961 g | | 1078 g | |
| Specific Gravity | 1.10 | | 1.29 | | 1.47 | | 1.48 | |
| HPHT filter temp @ 4 hr | B (g) | A (g) | B (g) | A (g) | B (g) | A (g) | B (g) | A (g) |
| 180° F.-RT | 3.62 | 3.5189 | 4.99 | 4.0160 | 13.2 | 0.7052 | 12.01 | 0.2961 |
| 180° F.-120° F. | 6.21 | 1.6244 | 6.66 | 0.9357 | 21.69 | 0.7102 | 24.6 | 0.1299 |
| 250° F.-RT | 12.92 | 1.9801 | 13.78 | 5.3126 | 52.13 | | 94.08 | 4.3985 |
| 250° F.-120° F. | 15.77 | 1.6576 | 21.23 | 2.7310 | 59.19 | | 54.37 | 1.7487 |
| 180° F.-RT | 97.21% | | 80.48% | | 5.34% | | 2.47% | |
| 180° F.-120° F. | 26.16% | | 14.05% | | 3.27% | | 0.53% | |
| 250° F.-RT | 15.33% | | 38.55% | | | | 4.68% | |
| 250° F.-120° F. | 10.51% | | 12.86% | | | | 3.22% | |

TABLE VIIA

Comparison of SrCO₃ RDF Example S13 and CaCO₃ RDF Comparative Example C1 at 10.28 ppg

| | | Examples | |
|---|---|---|---|
| Constituent | Sp. Gr. | S13 10.28 ppg | C1 10.28 ppg |
| Water | 1.00 | 314.50 | 300.10 |
| Sodium Carbonate | 2.69 | 0.50 | 0.50 |
| Caustic Soda | 2.10 | 0.25 | 0.25 |
| WEL-ZAN D | 1.55 | 1.00 | 1.00 |
| HP Starch (Cargill) | 1.50 | 5.00 | 5.00 |
| WEL-CARB | 2.71 | 25.00 | 125.00 |
| Strontium Carbonate | 3.80 | 85.50 | 0.00 |
| Calcium Carbonate | 2.70 | 0.00 | 85.50 |
| Total Mass | | 431.75 | 431.85 |
| Total Volume | | 350.51 | 350.51 |
| specific gravity | | 1.23 | 1.23 |

TABLE VIIB

Rheological Properties Strontium Carbonate RDF v. Calcium Carbonate RDF

| | Example | | | |
|---|---|---|---|---|
| | S13 Sp. Gr. | | C1 | |
| | 10.28 ppg | | 10.28 ppg | |
| Hot Rolling (16 hrs) | BHR | AHR | BHR | AHR |
| Viscometer Temp | 120 | 120 | 120 | 120 |
| 600 rpm | 54 | 64 | 71 | 74 |
| 300 rpm | 41 | 52 | 58 | 62 |
| 200 rpm | 35 | 40 | 51 | 57 |
| 100 rpm | 28 | 32 | 42 | 50 |
| 6 rpm | 11 | 14 | 20 | 24 |
| 3 rpm | 9 | 11 | 17 | 23 |
| GELS 10" | 8 | 11 | 16 | 23 |
| GELS 10' | 9 | 11 | 16 | 23 |
| APPARENT VISC. | 27 | 32 | 36 | 37 |
| PLASTC VISC. | 13 | 12 | 13 | 12 |
| YIELD POINT | 28 | 40 | 45 | 50 |
| API | 3.8 | | 4.3 | |
| Fluid Loss Temp. (° F.) | 180° F. | 250° F. | 180° F. | 250° F. |
| HTHP Fluid Loss | 16 | 86 | 16.8 | 34 |
| Cake thickness (in.) | 2/32" | 12/32" | 3/32" | 6/32" |
| pH | 11.5 | | 11.4 | |
| specific gravity | 1.23 | | 1.23 | |
| 15% HCl Acid | 403 g | | 607.5 g | |
| HPHT filter temp @ 4 hr | Insolubles | | | |
| 180° F.-RT | 1.47% | | 9.79% | |
| 180° F.-120° F. | 2.30% | | 13.54% | |
| 250° F.-RT | 0.25% | | 8.47% | |
| 250° F.-120° F. | 2.40% | | 7.27% | |

A sample of SrCO₃ sample used in the studies were analyzed to determine pore volume using helium gas as the probe gas. An 8.1723 g sample of the SrCO₃ was analyzed in helium gas at a temperature of 25.72° C. The equilibration rate as set at 0.005 psig/min. The sample was placed in a cell having a volume of 11.7000 cm³. The cell was purged five times with helium and the cell volume has expanded 8.4764 cm³. The data from each cycle is tabulated in Table VIII.

TABLE VIII

Total Pore Volume Determination of SrCO₃

| Cycle# | Pressure 1 (psig) | Pressure 2 (psig) | Volume (cm³) | Density (g/cm³) | Total Pore Volume (cm³/g) |
|---|---|---|---|---|---|
| 1 | 19.636 | 10.402 | 2.1520 | 3.7975 | 0.7367 |
| 2 | 19.627 | 10.396 | 2.1529 | 3.7959 | 0.7366 |
| 3 | 19.654 | 10.410 | 2.1537 | 3.7945 | 0.7365 |
| 4 | 19.647 | 10.406 | 2.1551 | 3.7921 | 0.7363 |
| 5 | 19.618 | 10.390 | 2.1561 | 3.7902 | 0.7362 |

| Summary Data | Average | Standard Deviation |
|---|---|---|
| Volume | 2.1540 cm³ | 0.0015 cm³ |
| Density | 3.7941 g/cm³ | 0.0026 g/cm³ |

6202- Total solids concentration is Invalid; liquid density is greater-than or equal to solids density.

Referring now to FIG. 3, the particle size distribution (PSD) of the SrCO₃ sample was analyzed from $0.01\mu$ to $3000\mu$. The particular SrCO₃ material used in these studies had a poly-modal distribution including a first mode of particles having particle between about $0.1\mu$ and $1\mu$, a second mode of particles between about $1\mu$ and about $30\mu$, a third mode of particles between about $30\mu$ and about $250\mu$, and a fourth mode of particles between about $250\mu$ and about $1000\mu$. The SrCO₃ sample had most of its particles of size within the second and third modes. The inventors believe that for bridging application, the SrCO₃ particles should have a single modal distribution.

Tables IXA&B list compositional data and rheological data for Examples S14 and S15 and Comparative Examples C2 and C3, where the compositions have different particle size distributions.

TABLE IXA

Comparison of SrCO₃ RDF Examples S14 and S15 and CaCO₃ RDF Comparative Examples C2 and C3 with Different Particle Size Distributions

| Constituent | SG | Example S14 | S15 | Constituent | SG | Example C2 | C3 |
|---|---|---|---|---|---|---|---|
| Water | 1.00 | 321.10 | 321.10 | Water | 1.00 | 311.47 | 311.47 |
| Soda Ash | 2.69 | 0.50 | 0.50 | Soda Ash | 2.69 | 0.50 | 0.50 |
| Caustic Soda | 2.10 | 0.25 | 0.25 | Caustic Soda | 2.10 | 0.25 | 0.25 |
| WEL-ZAN XG | 1.55 | 1.00 | 1.00 | WEL-ZAN XG | 1.55 | 1.00 | 1.00 |
| WEL-STAR HP | 1.50 | 6.00 | 6.00 | WEL-STAR HP | 1.50 | 6.00 | 6.00 |
| SrCO₃ 2 μm | 3.80 | 36.40 | 9.10 | CaCO3 2 μm | 2.71 | 36.40 | 9.10 |
| SrCO₃ 10 μm | 3.80 | 36.40 | 63.70 | CaCO3 10 μm | 2.71 | 36.40 | 63.70 |
| SrCO₃ 20 μm | 3.80 | 18.20 | 13.65 | CaCO3 20 μm | 2.71 | 18.20 | 13.65 |

TABLE IXA-continued

Comparison of SrCO₃ RDF Examples S14 and S15 and CaCO₃ RDF Comparative Examples C2 and C3 with Different Particle Size Distributions

| | | Example | | | | Example | |
|---|---|---|---|---|---|---|---|
| Constituent | SG | S14 | S15 | Constituent | SG | C2 | C3 |
| SrCO₃ 50 μm | 3.80 | 0.0 | 4.55 | CaCO3 50 μm | 2.71 | 0.0 | 4.55 |
| Biocide* | 1.06 | 0.25 | 0.25 | Biocide* | 1.06 | 0.25 | 0.25 |
| Disk size | | 10 μm | 20 μm | Disk size | | 10 μm | 20 μm |
| Total Mass | | 419.85 | 419.85 | Total Mass | | 410.22 | 410.22 |
| Total Volume | | 350.00 | 350.00 | Total Volume | | 350.00 | 350.00 |
| Sp. Gr. Calc. | | 1.20 | 1.20 | Sp. Gr. Calc. | | 1.17 | 1.17 |
| ppg | | 10.0 | 10.0 | ppg | | 9.78 | 9.78 |

TABLE IXB

Rheological Properties of Examples S14 and S15 and Comparative Examples C2 and C3

| | | Example | | | | | | Example | | | |
|---|---|---|---|---|---|---|---|---|---|---|---|
| | | S14 | | S15 | | | | C2 | | C3 | |
| Constituent | RPM | BHR | AHR | BHR | AHR | Constituent | RPM | BHR | AHR | BHR | AHR |
| Soda Ash | 600 | 56 | 58 | 58 | 60 | Soda Ash | 600 | 75 | 51 | 72 | 51 |
| DF-00257 | 300 | 42 | 44 | 45 | 46 | DF-00257 | 300 | 67 | 39 | 63 | 39 |
| Caustic Soda | 200 | 37 | 38 | 40 | 40 | Caustic Soda | 200 | 64 | 35 | 58 | 33 |
| DF-00264 | 100 | 30 | 29 | 31 | 32 | DF-00264 | 100 | 56 | 28 | 49 | 27 |
| WEL-ZAN XG | 6 | 10 | 12 | 12 | 13 | WEL-ZAN XG | 6 | 32 | 12 | 25 | 11 |
| DF-01036 | 3 | 9 | 9 | 10 | 10 | DF-01036 | 3 | 28 | 9 | 22 | 9 |
| WEL-STAR HP | PV | 14 | 14 | 13 | 14 | WEL-STAR HP | PV | 8 | 12 | 9 | 12 |
| DF-00486 | YP | 28 | 30 | 32 | 32 | DF-00486 | YP | 59 | 27 | 54 | 27 |
| SrCO₃ 2 μm | 10" | 9 | 9 | 9 | 10 | CaCO₃ 2 μm | 10" | 32 | 8 | 20 | 8 |
| DF-00506 | 10' | 10 | 9 | 10 | 10 | DF-00740 | 10' | 29 | 9 | 21 | 9 |
| SrCO₃ 10 μm | 4 hr FL | 20*2 = 40 | | 22*2 = 44 | | CaCO₃ 10 μm | 4 hr FL | 28*2 = 56 | | 36*2 = 72 | |

These first fluids were run side by side against calcium carbonate. Although the fluid loss was far from ideal this is a good comparison of the two different bridging materials. Also, notice the difference in low-end rheology, plastic viscosity, and yield points between the strontium carbonate compared to the calcium carbonate.

Tables XA&B list compositional data and rheological data for Examples S16 and S17 and Comparative Examples C4 and C5, where the compositions have different particle size distributions.

TABLE XA

Comparison of SrCO₃ RDF Examples S16 and S17 and CaCO₃ RDF Comparative Examples C4 and C5 with Different Particle Size Distributions

| | | Example | | | | Example | |
|---|---|---|---|---|---|---|---|
| Constituent | SG | S16 | S17 | Constituent | SG | C4 | C5 |
| Water | 1.00 | 320.87 | 320.87 | Water | 1.00 | 311.24 | 311.24 |
| Soda Ash | 2.69 | 0.50 | 0.50 | Soda Ash | 2.69 | 0.50 | 0.50 |
| Caustic Soda | 2.10 | 0.25 | 0.25 | Caustic Soda | 2.10 | 0.25 | 0.25 |
| WEL-ZAN XG | 1.55 | 1.00 | 1.00 | WEL-ZAN XG | 1.55 | 1.00 | 1.00 |
| WEL-STAR HP | 1.50 | 6.00 | 6.00 | WEL-STAR HP | 1.50 | 6.00 | 6.00 |
| SrCO₃ 2 μm | 3.80 | 38.00 | 15.00 | CaCO₃ 2 μm | 2.71 | 38.00 | 38.00 |
| SrCO₃ 10 μm | 3.80 | 37.00 | 60.00 | CaCO₃ 10 μm | 2.71 | 37.00 | 37.00 |
| SrCO₃ 20 μm | 3.80 | 16.00 | 16.00 | CaCO₃ 20 μm | 2.71 | 16.00 | 16.00 |
| SrCO₃ 50 μm | 3.80 | 0.0 | 9.00 | CaCO₃ 20 μm | 2.71 | 0.0 | 0.0 |
| Biocide* | 1.06 | 0.25 | 0.25 | Biocide* | 1.06 | 0.25 | 0.25 |
| Disk size | | 10 μm | 20 um | Disk size | | 10 μm | 20 μm |
| Total Mass | | 419.87 | 419.87 | Total Mass | | 410.24 | 410.22 |
| Total Volume | | 350.00 | 350.00 | Total Volume | | 350.00 | 350.00 |
| Sp. Gr. Calc. | | 1.20 | 1.20 | Sp. Gr. Calc. | | 1.17 | 1.17 |
| ppg | | 10.0 | 10.2 | ppg | | 9.78 | 9.78 |

TABLE XB

Rheological Properties of Examples S16 and S17 and Comparative Examples C4 and C5

| | | Example | | | | | | Example | | | |
|---|---|---|---|---|---|---|---|---|---|---|---|
| | | S16 | | S17 | | | | C4 | | C5 | |
| Constituent | RPM | BHR | AHR | BHR | AHR | Constituent | RPM | BHR | AHR | BHR | AHR |
| Soda Ash | 600 | 56 | 62 | 56 | 58 | Soda Ash | 600 | 80 | 60 | 82 | 58 |
| DF-00257 | 300 | 43 | 47 | 43 | 47 | DF-00257 | 300 | 74 | 55 | 76 | 47 |
| Caustic Soda | 200 | 37 | 41 | 37 | 42 | Caustic Soda | 200 | 69 | 52 | 70 | 43 |
| DF-00264 | 100 | 28 | 32 | 28 | 34 | DF-00264 | 100 | 61 | 44 | 62 | 36 |
| WEL-ZAN XG | 6 | 11 | 13 | 10 | 13 | WEL-ZAN XG | 6 | 38 | 23 | 38 | 18 |
| DF-01036 | 3 | 9 | 10 | 8 | 9 | DF-01036 | 3 | 35 | 20 | 35 | 16 |
| WEL-STAR HP | PV | 13 | 15 | 13 | 11 | WEL-STAR HP | PV | 6 | 5 | 6 | 11 |
| DF-00486 | YP | 30 | 32 | 30 | 36 | DF-00486 | YP | 68 | 50 | 70 | 36 |
| $SrCO_3$ 2 μm | 10" | 9 | 10 | 8 | 9 | $CaCO_3$ 2 μm | 10" | 38 | 14 | 34 | 15 |
| DF-00506 | 10' | 11 | 11 | 9 | 11 | DF-00740 | 10' | 35 | 3 | 34 | 14 |
| $SrCO_3$ 10 μm DF-00505 | 4 hr FL | 21*2 = 42 | | 20*2 = 40 | | $CaCO_3$ 10 μm DF-00743 | 4 hr FL | 22*2 = 44 | | 27*2 = 54 | |

After using a new starch the calcium carbonate shows a better fluid loss, its bridging ability, still does not compare with that of strontium carbonate.

Tables XIA&B list compositional data and rheological data for Examples S18 and S19 and Comparative Examples C6 and C7, where the compositions have different particle size distributions.

TABLE XIA

Comparison of $SrCO_3$ RDF Examples S18 and S19 and $CaCO_3$ RDF Comparative Examples C6 and C7 with Different Particle Size Distributions

| | | Example | | | | Example | |
|---|---|---|---|---|---|---|---|
| Constituent | SG | S18 | S19 | Constituent | SG | C6 | C7 |
| Water | 1.00 | 321.10 | 321.10 | Water | 1.00 | 311.47 | 311.47 |
| Soda Ash | 2.69 | 0.50 | 0.50 | Soda Ash | 2.69 | 0.50 | 0.50 |
| Caustic Soda | 2.10 | 0.25 | 0.25 | Caustic Soda | 2.10 | 0.25 | 0.25 |
| WEL-ZAN XG | 1.55 | 1.00 | 1.00 | WEL-ZAN XG | 1.55 | 1.00 | 1.00 |
| WEL-STAR HP | 1.50 | 6.00 | 6.00 | WEL-STAR HP | 1.50 | 6.00 | 6.00 |
| $SrCO_3$ 2 μm | 3.80 | 11.00 | 5.00 | $CaCO_3$ 2 μm | 2.71 | 11.00 | 5.00 |
| $SrCO_3$ 10 μm | 3.80 | 52.00 | 20.00 | $CaCO_3$ 10 μm | 2.71 | 52.00 | 20.00 |
| $SrCO_3$ 20 μm | 3.80 | 23.00 | 55.00 | $CaCO_3$ 20 μm | 2.71 | 23.00 | 55.00 |
| $SrCO_3$ 50 μm | 3.80 | 5.00 | 11.00 | $CaCO_3$ 50 μm | 2.71 | 5.00 | 11.00 |
| Biocide* | 1.06 | 0.25 | 0.25 | Biocide* | 1.06 | 0.25 | 0.25 |
| Disk size | | 40 μm | 50 μm | Disk size | | 40 μm | 50 μm |
| Total Mass | | 419.85 | 419.85 | Total Mass | | 410.22 | 410.22 |
| Total Volume | | 350.00 | 350.00 | Total Volume | | 350.00 | 350.00 |
| Sp. Gr. Calc. | | 1.20 | 1.20 | Sp. Gr. Calc. | | 1.17 | 1.17 |
| ppg | | 10.0 | 10.0 | ppg | | 9.78 | 9.78 |

TABLE XIB

Rheological Properties of Examples S18 and S19 and Comparative Examples C6 and C7

| | | Example | | | | | | Example | | | |
|---|---|---|---|---|---|---|---|---|---|---|---|
| | | S18 | | S19 | | | | C6 | | C7 | |
| Constituent | RPM | BHR | AHR | BHR | AHR | Constituent | RPM | BHR | AHR | BHR | AHR |
| Soda Ash | 600 | 65 | 55 | 62 | 55 | Soda Ash | 600 | 67 | 56 | 69 | 58 |
| DF-00257 | 300 | 51 | 42 | 51 | 43 | DF-00257 | 300 | 62 | 44 | 57 | 46 |
| Caustic Soda | 200 | 43 | 37 | 40 | 37 | Caustic Soda | 200 | 59 | 38 | 53 | 41 |
| DF-00264 | 100 | 33 | 30 | 30 | 30 | DF-00264 | 100 | 51 | 32 | 45 | 34 |
| WEL-ZAN XG | 6 | 13 | 12 | 11 | 12 | WEL-ZAN XG | 6 | 27 | 14 | 22 | 16 |
| DF-01036 | 3 | 10 | 9 | 9 | 10 | DF-01036 | 3 | 23 | 12 | 19 | 13 |
| WEL-STAR HP | PV | 14 | 13 | 11 | 12 | WEL-STAR HP | PV | 5 | 12 | 12 | 12 |
| DF-00486 | YP | 37 | 29 | 40 | 31 | DF-00486 | YP | 57 | 32 | 45 | 34 |
| $SrCO_3$ 2 μm | 10" | 9 | 8 | 9 | 9 | $CaCO_3$ 2 μm | 10" | 20 | 11 | 18 | 12 |
| DF-01059 | 10' | 11 | 9 | 10 | 10 | DF-00740 | 10' | 15 | 11 | 18 | 12 |

TABLE XIB-continued

Rheological Properties of Examples S18 and S19 and Comparative Examples C6 and C7

| | | Example | | | | | | Example | | | |
|---|---|---|---|---|---|---|---|---|---|---|---|
| | | S18 | | S19 | | | | C6 | | C7 | |
| Constituent | RPM | BHR | AHR | BHR | AHR | Constituent | RPM | BHR | AHR | BHR | AHR |
| $SrCO_3$ 10 μm | spurt | | 3 | | 11 | $CaCO_3$ 10 μm | spurt | | 1 | | 1 |
| DF-00505 | 30 min | | 10 | | 18 | DF-00743 | 30 min | | 10 | | 9 |
| $SrCO_3$ 20 μm | 1 hr | | | | | $CaCO_3$ 20 μm | 1 hr | | | | |
| DF-01060 | 2 hr | | | | | DF-00742 | 2 hr | | | | |
| $SrCO_3$ 50 μm | 3 hr | | | | | $CaCO_3$ 50 μm | 3 hr | | | | |
| DF-01057 | 4 hr | | 21.5 | | 32 | DF-00750 | 4 hr | | 26.5 | | 32 |
| Biocide | Total | | 40 | | 53 | Biocide | Total | | 52 | | 63 |

This run is the last comparison of the strontium carbonate with calcium carbonate. The strontium carbonate once again outperforms the calcium carbonate for the same ceramic disk size. Also, make not in the difference in rheologies before and after hot-rolling of the two different types of formulations, strontium and calcium.

These first three batches of formulations were made mainly for comparison, but also seeking out the perfect combination of sizes. Sizes were eventually found and tested for fluid loss. These are listed below.

Tables XIIA&B list compositional data and rheological data for Examples S20, S21, S22 and S23, where the compositions have different particle size distributions.

TABLE XIIA $SrCO_3$ Examples S20, S21, S22 and S23 Having Different Particle Size Distributions

| | | Example | | | |
|---|---|---|---|---|---|
| Constituent | SG | S20 | S21 | S22 | S23 |
| Water | 1.00 | 321.10 | 321.10 | 321.10 | 321.10 |
| Soda Ash | 2.69 | 0.50 | 0.50 | 0.50 | 0.50 |
| Caustic Soda | 2.10 | 0.25 | 0.25 | 0.25 | 0.25 |
| WEL-ZAN XG | 1.55 | 1.00 | 1.00 | 1.00 | 1.00 |
| WEL-STAR HP | 1.50 | 6.00 | 6.00 | 6.00 | 6.00 |
| $SrCO_3$ 2 μm | 3.80 | 15.00 | 20.00 | 20.00 | 25.00 |
| $SrCO_3$ 10 μm | 3.80 | 31.00 | 26.00 | 30.00 | 26.00 |
| $SrCO_3$ 20 μm | 3.80 | 30.00 | 25.00 | 21.00 | 20.00 |
| $SrCO_3$ 50 μm | 3.80 | 15.00 | 20.00 | 20.00 | 20.00 |
| Biocide* | 1.06 | 0.25 | 0.25 | 0.25 | 0.25 |
| Disk Size | | 40 μm | 40 μm | 40 μm | 40 μm |
| Total Mass | | 419.85 | 419.85 | 419.85 | 419.85 |
| Total Volume | | 350.00 | 350.00 | 350.00 | 350.00 |
| Sp. Gr. Calc. | | 1.20 | 1.20 | 1.20 | 1.20 |
| ppg | | 10.0 | 10.0 | 10.0 | 10.0 |

TABLE XIIB

Rheological Properties of Examples S20, S21, S22 and S23

| | | Example | | | | | | | |
|---|---|---|---|---|---|---|---|---|---|
| | | S20 | | S21 | | S22 | | S23 | |
| Constituent | RPM | BHR | AHR | BHR | AHR | BHR | AHR | BHR | AHR |
| Soda Ash | 600 | 55 | 60 | 59 | 60 | 60 | 63 | 61 | 62 |
| DF-00257 | 300 | 42 | 48 | 45 | 47 | 46 | 49 | 47 | 49 |
| Caustic Soda | 200 | 35 | 41 | 39 | 41 | 40 | 43 | 40 | 43 |
| DF-00264 | 100 | 28 | 33 | 31 | 33 | 32 | 35 | 32 | 35 |
| WEL-ZAN XG | 6 | 9 | 15 | 13 | 15 | 13 | 15 | 13 | 15 |
| DF-01036 | 3 | 8 | 12 | 11 | 13 | 11 | 12 | 11 | 13 |
| WEL-STAR HP | PV | 13 | 12 | 14 | 13 | 14 | 14 | 14 | 13 |
| DF-00486 | YP | 29 | 36 | 31 | 34 | 32 | 35 | 33 | 36 |
| $SrCO_3$ 2 μm | 10" | 8 | 11 | 9 | 12 | 9 | 13 | 10 | 12 |
| DF-01059 | 10' | 8 | 12 | 10 | 12 | 10 | 12 | 11 | 13 |
| $SrCO_3$ 10 μm | spurt | | 0 | | 0 | | 0 | | 0 |
| DF-01058 | 30 min | | 3 | | 1 | | 2 | | 2 |
| $SrCO_3$ 20 μm | 1 hr | | 6 | | 4 | | 5 | | 5 |
| DF-01060 | 2 hr | | 9 | | 7.5 | | 7.5 | | 7.5 |
| $SrCO_3$ 50 μm | 3 hr | | 12 | | 10 | | 10.5 | | 10.5 |
| DF-01057 | 4 hr | | 14 | | 12.5 | | 12.5 | | 13 |
| BIOCIDE | Total | | 28 | | 25 | | 25 | | 26 |

Tables XIIIA&B list compositional data and rheological data for Examples S24, S25, S26 and S27, where the compositions have different particle size distributions.

TABLE XIIIA

SrCO₃ Examples S24, S25, S26 and S27 Having Different Particle Size Distributions

| Constituent | SG | S24 | S25 | S26 | S27 |
|---|---|---|---|---|---|
| Water | 1.00 | 321.10 | 321.10 | 321.10 | 321.10 |
| SodaAsh | 2.69 | 0.50 | 0.50 | 0.50 | 0.50 |
| CausticSoda | 2.10 | 0.25 | 0.25 | 0.25 | 0.25 |
| WEL-ZAN XG | 1.55 | 1.00 | 1.00 | 1.00 | 1.00 |
| WEL-STAR HP | 1.50 | 6.00 | 6.00 | 6.00 | 6.00 |
| SrCO₃ 2 μm | 3.80 | 30.00 | 26.00 | 20.00 | 15.00 |
| SrCO₃ 10 μm | 3.80 | 26.00 | 25.00 | 25.00 | 26.00 |
| SrCO₃ 20 μm | 3.80 | 20.00 | 20.00 | 26.00 | 25.00 |
| SrCO₃ 50 μm | 3.80 | 15.00 | 20.00 | 20.00 | 25.00 |
| Biocide* | 1.06 | 0.25 | 0.25 | 0.25 | 0.25 |
| Disk Size | | 20 μm | 20 μm | 20 μm | 20 μm |
| | | 419.85 | 419.85 | 419.85 | 419.85 |
| Total Volume | | 350.00 | 350.00 | 350.00 | 350.00 |
| Sp. Gr. Calc. | | 1.20 | 1.20 | 1.20 | 1.20 |
| ppg | | 10.0 | 10.0 | 10.0 | 10.0 |

TABLE XIIIB

Rheological Properties of Examples S24, S25, S26 and S27

| | | S24 | | S25 | | S26 | | S27 | |
|---|---|---|---|---|---|---|---|---|---|
| Constituent | RPM | BHR | AHR | BHR | AHR | BHR | AHR | BHR | AHR |
| Soda Ash | 600 | | | | | | | | |
| DF-00257 | 300 | | | | | | | | |
| Caustic Soda | 200 | | | | | | | | |
| DF-00264 | 100 | | | | | | | | |
| WEL-ZAN XG | 6 | | | | | | | | |
| DF-01036 | 3 | | | | | | | | |
| WEL-STAR HP | PV | | | | | | | | |
| DF-00486 | YP | | | | | | | | |
| SrCO₃ 2 μm | 10" | | | | | | | | |
| DF-01059 | 10' | | | | | | | | |
| SrCO₃ 10 μm | spurt | 10 | 13 | | | 0 | 0 | | |
| DF-01058 | 30 min | 15 | 17 | | | 1 | 0 | | |
| SrCO₃ 20 μm | 1 hr | Fluids | Failed | | | | | | |
| DF-01060 | 2 hr | | | | | | | | |
| SrCO₃ 50 μm | 3 hr | | | | | 9.5 | 7.5 | | |
| DF01057 | 4 hr | | | | | 11 | 9.5 | | |
| BIOCIDE | Total | −10 | −13 | | | 22 | 19 | | |

Due to the high fluid loss of the first two fluids, S24 and S25, the runs were stopped. The fluid lost was mostly white, which is due to the high content of strontium carbonate at 2 μm. The 2 μm particles merely seeped through the ceramic disks. The rheologies are in the range for which we need for these for these fluids in every run as of yet and thus will not be checked in these runs.

Before the fluid loss test is run a blank run is tested on the ceramic filter disk to check the time taken for 200 mL of 3% KCl to permeate through the disk after being saturated in 3% KCl for 30 minutes under negative pressure. Each ceramic disk will have a different permeability time, thus an average permeability time will be used with a percent error. After the fluid loss tests were run acid breaker is run four hours at 100 psi, followed by the final return permeability test. Each strontium carbonate filter cake dissolved faster than those with calcium carbonate. Also, 100% return permeability has been observed after breaker cleanup, however the minimum will be observed to be greater than 70%. The ceramic disks run with strontium carbonate have once again exceeded those run with calcium carbonate in terms of return permeability time.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A drilling fluid composition comprising:
a base fluid, a thickening system comprising hydratable polymers selected from the group consisting of polyvinyl polymers, polyacrylamides, cellulose ethers, polysaccharides, lignosulfonates, ammonium salts of lignosulfonates, alkali metal salts of lignosulfonates, alkaline earth salts of lignosulfonate, acrylic acid-acrylamide copolymers, acrylic acid-methacrylamide copolymers, polyacrylamides, partiallyhydrolyzed polyacrylamides, partially hydrolyzed polymethacrylamides, polyvinyl alcohols, polyvinyl acetates, polyalkyleneoxides, carboxycelluloses, carboxyalkylhydroxyethyl celluloses, hydroxyethylcellulose, galactomannans, substituted galactomannans, heteropolysaccharides obtained by the fermentation of starch-derived sugar, ammonium and alkali metal salts thereof, and mixtures thereof, and a weighting and bridging system comprising an effective amount of unmodified strontium carbonate (SrCO₃) particles having a mono-modal, bi-modal, poly-modal, or equally distributed modality particle size distribution (PSD) comprising particles of 50μ D50, 100μ D50, 200μ D50, 500μ D50, 1000μ D50, 2000μ D50, 3000μ D50, 4000μ D50 and 5000μ D50 to form a filter cake on a formation, a screen, a gravel pack, or other similar structure that substantially mimics a pore size distribution of the formation, the screen, the gravel pack, or the other similar structure to effectively plug the pore size distribution of the formation, the screen, the gravel pack, or the other similar structure,
wherein the mono-modal PSD has a single center, wherein the bi-modal PSD has two centers, wherein the poly-modal has more than two centers, wherein the equally distributed modality includes equal amounts of all particle sizes, wherein the filter cake is removable by acid treatment, wherein strontium carbonate has improved acid removal properties relative to calcium carbonate and reduced dissolves, and wherein strontium carbonate removal reduces skin damage to formation surfaces.

2. The composition of claim 1, wherein the mono-modal particle size distribution comprises a bell shaped or Gaussian particle distribution of particles having D50 sizes between about 2 µm and about 1000 µm.

3. The composition of claim 1, wherein the mono-modal particle size distribution comprises a bell shaped or Gaussian particle distribution of particles having D50 sizes between about 2 µm and about 500 µm.

4. The composition of claim 1, wherein the mono-modal particle size distribution comprises a bell shaped or Gaussian particle distribution of particles having D50 sizes between about 2 µm and about 100 µm.

5. The composition of claim 1, wherein the mono-modal distribution is centered at 2500µ.

6. The composition of claim 1, wherein the mono-modal distribution comprises:
(a) particles having D50 values between about 2µ and about 4000µ centered at 2000µ, or
(b) particles having D50 values between about 2µ and about 3000µ centered at 1500µ, or
(c) particles having D50 values between about 2µ and about 2000µ centered at 1000µ, or
(d) particles having D50 values between about 2µ and about 1000µ centered at 500µ, or
(e) particles having D50 values between about 2µ and about 500µ centered at 250µ, or
(f) particles having D50 values between about 2µ and about 250µ centered at 150µ, or
(g) particles having D50 values between about 2 µm and about 100 µm centered at 50µ.

7. The composition of claim 1, wherein the drilling fluid has a density between 8.78 ppg and 13.28 ppg.

8. A method for making drilling fluids comprising the step of:
contacting a base fluid, a thickening system, and a weighting and bridging system under mixing conditions to form a drilling fluid composition, where the thickening system comprise hydratable polymers selected from the group consisting of polyvinyl polymers, polyacrylamides, cellulose ethers, polysaccharides, lignosulfonates, ammonium salts of lignosulfonates, alkali metal salts of lignosulfonates, alkaline earth salts of lignosulfonate, acrylic acid-acrylamide copolymers, acrylic acid-methacrylamide copolymers, polyacrylamides, partially hydrolyzed polyacrylamides, partially hydrolyzed polymethacrylamides, polyvinyl alcohols, polyvinyl acetates, polyalkyleneoxides, carboxycelluloses, carboxyalkylhydroxyethyl celluloses, hydroxyethylcellulose, galactomannans, substituted galactomannans, heteropolysaccharides obtained by the fermentation of starch-derived sugar, ammonium and alkali metal salts thereof, and mixtures thereof, and wherein the weighting and bridging system includes an effective amount of unmodified strontium carbonate particles having a mono-modal, bi-modal, poly-modal, or equally distributed modality particle size distribution (PSD) comprising particles of 50µ D50, 100µ D50, 200µ D50, 500µ D50, 1000µ D50, 2000µ D50, 3000µ D50, 4000µ D50 and 5000µ D50 to form a filter cake on a formation, a screen, a gravel pack, or other similar structure that substantially mimic a pore size distribution of a formation, a screen, a gravel pack, or other similar structure to effectively plug the pore size distribution of the formation, the screen, the gravel pack, or the other similar structure, wherein the mono-modal PSD is a Gaussian PSD, wherein the bi-modal PSD is distribution having two centers, wherein the poly-modal is a distribution having at least three centers, wherein the equally distributed modality distribution includes equal amounts of all particle sizes, wherein the filter cake is removable by acid treatment, wherein strontium carbonate has improved acid removal properties relative to calcium carbonate and reduced dissolves and wherein strontium carbonate reduces skin damage to formation surfaces.

9. The method of claim 8, wherein in the contacting step the mono-modal particle size distribution comprises a bell shaped or Gaussian particle distribution of particles having D50 sizes between about 2 µm and about 1000 µm.

10. The method of claim 8, wherein in the contacting step the mono-modal particle size distribution comprises a bell shaped or Gaussian particle distribution of particles having D50 sizes between about 2 µm and about 500 µm.

11. The method of claim 8, wherein in the contacting step the mono-modal particle size distribution comprises a bell shaped or Gaussian particle distribution of particles D50 sizes between about 2 µm and about 100 µm.

12. The method of claim 8, wherein in the contacting step the mono-modal distribution is centered at 2500µ.

13. The method of claim 8, wherein the drilling fluid has a density between 8.78 ppg and 13.28 ppg.

14. The method of claim 1, wherein the drilling fluid has a density between 8.78 ppg and 13.28 ppg.

* * * * *